June 20, 1950     L. VON CSEH     2,512,187
SPRING SCALE

Filed June 8, 1945     4 Sheets-Sheet 1

INVENTOR.
Louis Von Cseh
BY
ATTORNEY.

June 20, 1950 L. VON CSEH 2,512,187
SPRING SCALE

Filed June 8, 1945 4 Sheets-Sheet 2

INVENTOR.
Louis Von Cseh
BY
ATTORNEY.

June 20, 1950            L. VON CSEH            2,512,187
SPRING SCALE

Filed June 8, 1945                             4 Sheets-Sheet 3

INVENTOR.
Louis Von Cseh
BY
ATTORNEY.

June 20, 1950 L. VON CSEH 2,512,187
SPRING SCALE
Filed June 8, 1945 4 Sheets-Sheet 4
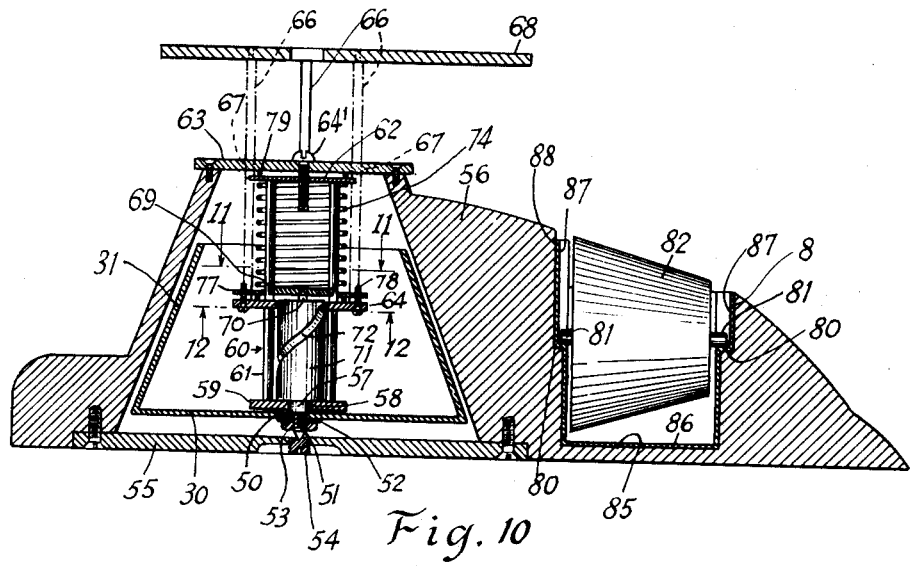
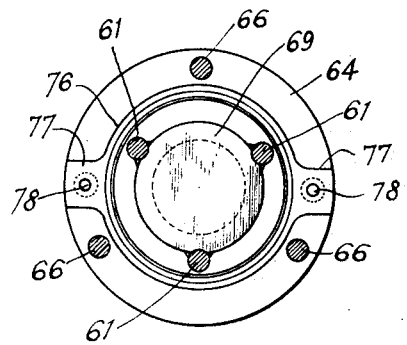
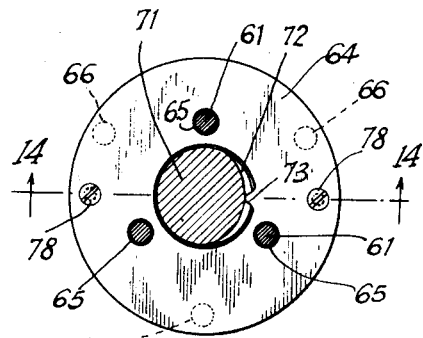
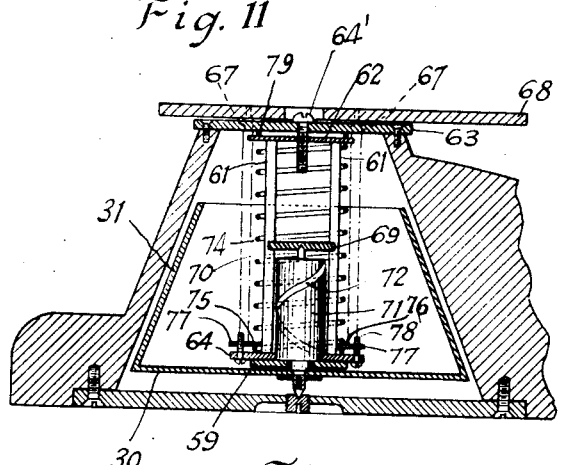
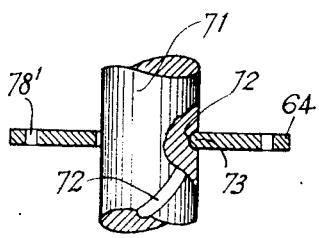
INVENTOR.
Louis Von Cseh
ATTORNEY.

Patented June 20, 1950

2,512,187

UNITED STATES PATENT OFFICE 2,512,187

SPRING SCALE

Louis von Cseh, New York, N. Y., assignor to Speed Products Company, Inc., Long Island City, N. Y., a corporation of New York Application June 8, 1945, Serial No. 598,262

10 Claims. (Cl. 265—68)

1

The invention is a measuring device and more particularly is concerned with a weighing scale particularly adapted for office use. The object of the invention is realized in the provision of a functionally and structurally improved and novel scale wherein a rectilinearly guided, spring controlled and normally elevated plunger carrying a loading platform embodies means for actuating a rotatable member bodily carrying an indicia carrying drum adapted to be displaced before indicating means of a casing enclosing the rotatable drum in proportion to the load applied to the platform and against the resistance of an appropriate spring which normally holds the platform elevated. The invention has as a further object the provision of a postal scale wherein the rectilinear motion of the plunger is translated into a rotary motion for causing the rotational displacement of the indicia carrying drum about its vertical axis. A further object is concerned with the utilization in a postal scale of a rotatable and easily accessible stamp moistening means. Other objects, advantages and salient functional and structural features of the invention will be more readily understood from the following detailed specification considered in the light of the accompanying drawings wherein:

Figure 2:
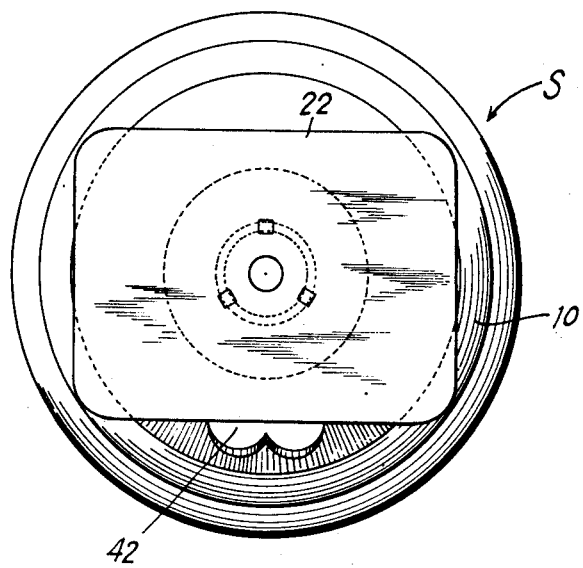
Fig. 2 is a plan view of Fig. 1.
Figure 1:
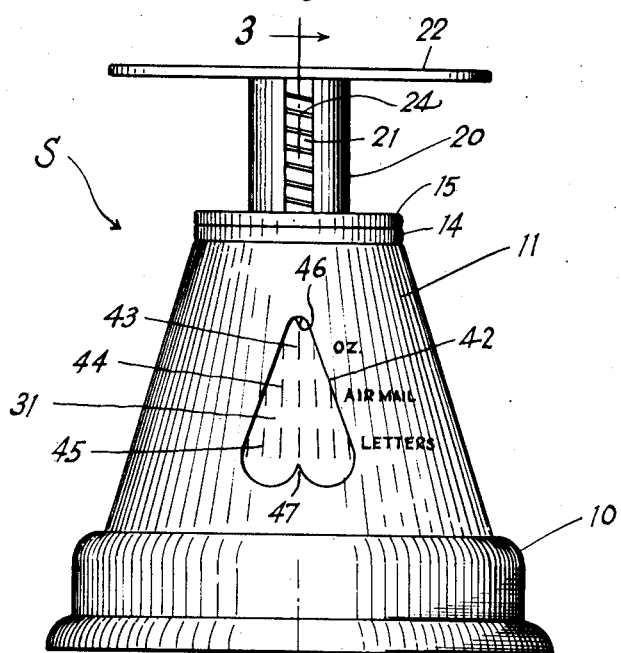
Fig. 1 is a front view of the scale according to my invention.
Figure 4:
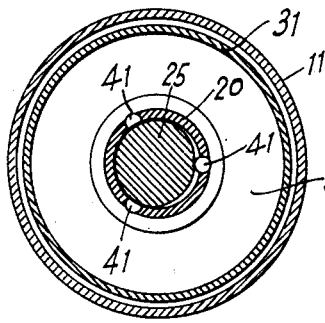
Figure 5:
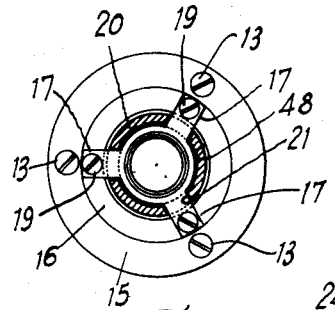
Figure 3:
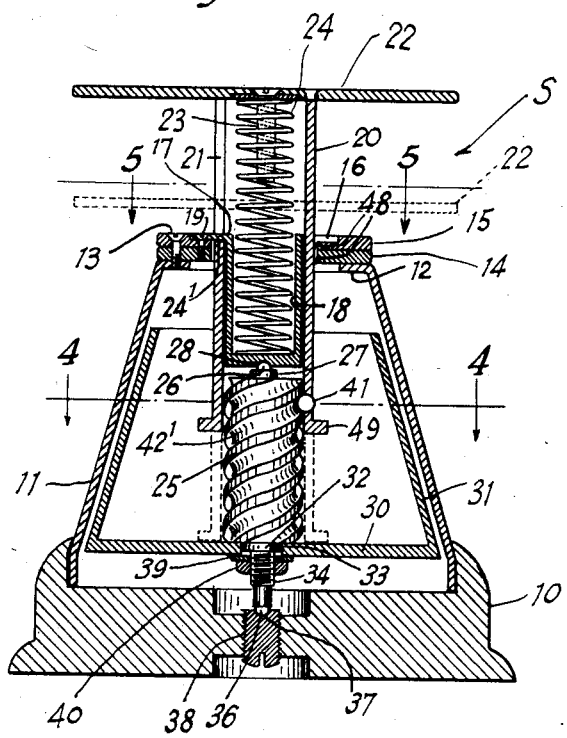
Fig. 3 is a sectional view on the line 3—3 of Fig. 1.

Figs. 4 and 5 are sectional views on the lines 4—4 and 5—5 respectively of Fig. 3.

Figure 6:
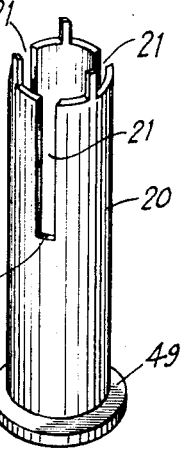

Fig. 6 is a perspective view of the slidable sleeve or plunger.

Figure 7:
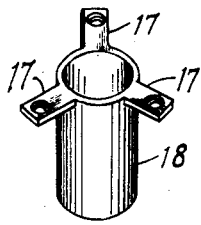

Fig. 7 is a perspective view of the fixed guide for the slidable plunger.

Figure 8:
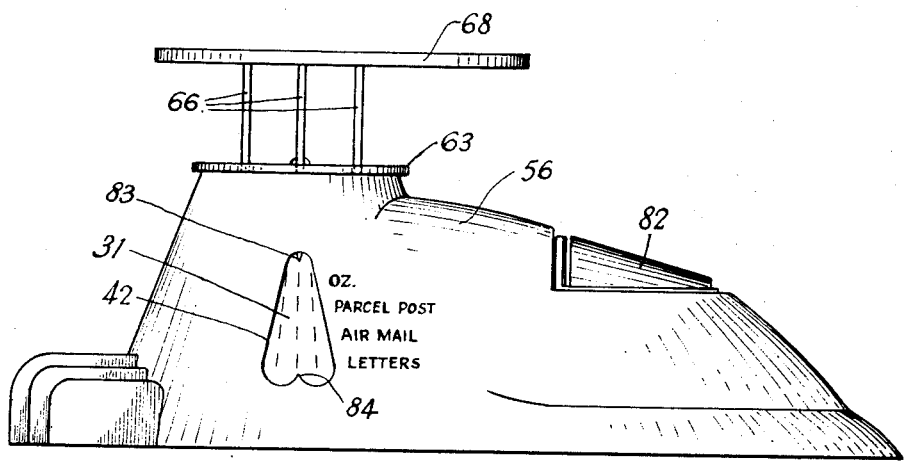

Fig. 8 is a side elevational view of another embodiment according to my invention.

Figure 9:
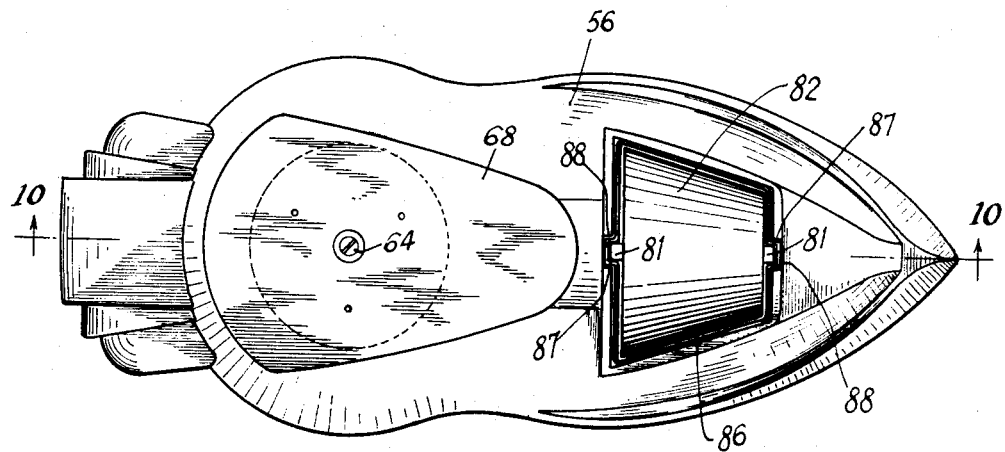

Fig. 9 is a plan view of Fig. 8.

Fig. 10 is a sectional view on the line 10—10 of Fig. 9.

Figs. 11 and 12 are sectional views on the lines 11—11 and 12—12 respectively of Fig. 10.

Fig. 13 is a fragmentary view of Fig. 10, however, illustrating the plunger carrying platform fully depressed; and Fig. 14 is a sectional view on the line 14—14 of Fig. 12.

In the form according to Figs. 1–7 the scale is generally denoted S and comprises the circular base 10 appropriately fixedly sustaining the frusto conical and hollow shell or casing 11 having an upper inwardly disposed annular flange 12 to

2 which are affixed by screws 13 the superimposed and concentrically arranged annular discs 14 and 15, the latter having an annular channel 16 receiving the radially arranged ends or lugs 17 of the cylindrical spring holder or cup 18. Screws 19 fasten the three lugs 17 in the channel 16 of the upper annular disc 15. By this arrangement, the spring holder 18 is firmly fastened relative to the hollow casing or shell 11.

Closely surrounding the fixed spring holder or support 18 is the cylindrical and rectilinearly displaceable tube or plunger 20 provided with the spaced slots 21, the sides of which closely but movably straddle the fixed radial lugs 17 of the spring holder or cup 18.

Fixedly secured to the slotted tube 20 is the loading platform or article support 22 from which depends the coaxially arranged stud 23 surrounded by the upper end of the normally expanded helicoidal spring 24 disposed in part within the slidable tube or plunger 20 and in part is confined in the fixed cup or holder 18. Normally therefore the platform is elevated as shown in the full line position in Fig. 3 at which time the end walls 24' of slots 21 are against the lugs 17 which characterize stop means for limiting upward rectilinear displacement of the platform carrying plunger.

Rectilinear displacement of the slidably guided plunger 20 is utilized to impart a rotary motion to the worm or driven member 25 having a spheroidal or anti-friction member 26 rotatably retained in socket or stub shaft 27 extending from one end of the worm 25. This anti-friction member 26 is journaled in the bearing or recess 28 in the bottom wall of the fixed spring holder or cup 18.

The worm or driven member 25 has its lower end seated on and firmly secured on the bottom wall 30 of the graduated indicia bearing frusto conical hollow drum or dial 31. Specifically, worm 25 is provided with a reduced cylindrical portion or stub shaft 32 fitting into opening 33 in the bottom wall 30 and also includes a threaded depending extension 34 terminating in a socket rotatably confining the anti-friction spheroidal member 36 seated in the notch or bearing 37 in the adjustable plug 38 threadably carried by the base 10.

Surrounding the threaded extension 34 is a spring washer 39 tightened against the bottom wall 30 of the graduated dial 31 by the internally threaded nut or clamping means 40. By this arrangement the worm is adjustably and removably although fixedly fastened to the drum or dial 31, and hence if the worm 25 be rotated by the reciprocable tubular plunger 20, the graduated drum 31 revolves about its vertical axis.

The reciprocable plunger 20 rotatably carries three anti-friction balls or spheroids 41 coacting with the walls of the helical groove 42' of the worm 25. Consequently if the plunger 20 is actuated the spheroids drive the worm or in other words, the worm is rotated. Since the graduated drum 31 is fastened to the stub shaft 32 of the worm, it will bodily rotate relative to the shell or casing 11 which embodies a window 42 and includes appropriate designations or indicia such as "Oz", "Air Mail", and "Letters" along side of suitable rows of graduations 43, 44 and 45 of the rotary drum 31 to designate with the aid of the indicators or pointers 46 and 47 extending from the casing and inwardly of the opening or window 42 the weight of the load applied to the platform and the corresponding charges for air mail and ordinary letters. Of course it is within the scope of the invention to utilize the scale for other purposes than the weighing of letters and determining the amount of postage required.

In operation, the load applied to the platform 22 slidably and rectilinearly displaces tubular plunger 20 also guided in the alined openings 48 in the superimposed but fixed annular discs 14 and 15 against the resistance of the normally expanded spring 24. By this action the worm 25 is rotatably driven and the graduated drum or dial 31 is revolved or displaced in proportion to the load applied on the platform and the readings of the weight of the load and postal charges may be readily obtained. Downward displacement of the plunger 20 is limited when the annular flange 49 strikes the bottom wall 30 of the graduated drum 31.

In the form illustrated in Figs. 8 to 14, the bottom wall 30 of the rotatable and graduated drum or dial 31 has an opening 50 through which the threaded shank 51 projects and about the latter is disposed the spring washer 52 and internally threaded clamping nut 53. The shank 51 is provided with a pointed terminal revolvably seated on the adjustable and threaded bearing or plug 54 in the bottom wall or base 55 removably connected to the casing 56.

Shank 51 depends from the stub shaft 57 rotatably mounted in the opening 58 of the lower disc 59 of an inner cage generally denoted 60 comprising the spaced guide rods 61 fixed to the lower disc 59 and to the upper disc 62 adjustably associated with the superimposed closure disc 63 by the threaded screw 64', the shank of which permits the displacement of the upper disc 62 relative to the closure disc 63.

Intermediate of the inner cage 60 and interposed between the lower disc 59 and the closure disc 63 is the disc 64 having openings 65 through which the spaced and fixed rods 61 of the inner cage project. Thus disc 64 is slidably guided along these rods and relative to this cage. However, slidable disc 64 carries three upstanding posts 66 which project through and are slidably guided in openings 67 of the closure or closure disc 63 and to the upper portions of these posts 66 is anchored the article receiving platform 68. By this arrangement, the outer slidable cage defined by the slidably guided disc 64, the outer posts 66 anchored thereto, and the platform 68 fastened to the posts 66, may be bodily displaced relative to the inner cage 60 comprising the lower disc 59, the rods 61 anchored thereto, and the upper disc 62.

Fixedly anchored to the rods 61 in any appropriate manner is the disc 69 serving as a bearing for the shaft portion 70 of the worm 71 which has its lower shaft portion 57 rotatably guided in the lower disc 59 of the inner cage 60.

The worm 71 may be said to have a helically arranged groove 72 in mesh with the single tooth 73 of the lower slidably and rectilinearly guided disc 64 of the outer cage. Hence if the outer cage is rectilinearly displaced relative to the inner cage, tooth 73 actuates the worm and the latter is rotated. Or in other words, a load on the platform 68 would cause the worm to be actuated about its vertical axis.

Since the bottom wall 30 of the graduated frusto conical drum 31 is clamped by the washer 52 and adjustable nut 53 against the stub shaft 57 of the worm 71, the drum 31 is thereby bodily rotated with the worm when actuated or driven by the outer slidable cage.

Normally the outer cage is held elevated by the helicoidal normally compressed spring 74 surrounding the rods 61 of the inner cage. This spring has its lower to lowest terminal coil 75 in part interposed between an adjustable annular clamping disc 76 and the slidably guided driving toothed disc 64 of the outer cage. The disc or spring support 76 has radially extending diametrically disposed lugs 77 adjustably receiving set screws 78 projecting through openings 78' in the driving disc 64. By this arrangement, the lowest part of the helicoidal spring 74 is held anchored to the outer slidable cage.

The upper end or last coil 79 of spring 74 is held anchored to the closure disc 63 by clamping disc 62 of the inner cage upon the manipulation of the adjustable threaded member 64'. It follows that the lower end of the spring 74 is fastened to the lower end of the slidably guided outer cage while its upper end is fastened by the inner cage against the closure disc 63. If therefore the outer cage which may be considered as a plunger is displaced downwardly due to a load on platform 68, spring 74 which is normally contracted, expands, for example, in Fig. 13, spring 74 is shown fully expanded and the platform has reached its maximum depression, being resisted against further downward displacement when the annular disc 64 of the outer slidable cage strikes the lower disc 59 of the fixed inner cage. Of course a lighter load on the platform would only partly expand the spring. However, once the reading is made and the load is removed from the platform, spring 74 automatically raises the outer slidable cage or plunger and thus its platform 68 and the graduated drum is restored to its zero reading as is well understood.

The extent of rotatable displacement of the graduated drum 31 may be read by the aid of the alined and pointed extension or indicators 83 and 84 along the boundary of the window or opening 42 in the casing or housing 56 which includes a recess 85 closely confining the liquid containing receptacle 86 provided with the alined and hollow ribs 87 defining shoulders 80 to position and removably sustain the alined stub shafts 81 of the frusto conical rotatable moistening member or roller 82, ribs 87 serving as vertical guides for leading the stub shafts 81 to the shoulders or bearings 80. By this arrangement, the moistening roller or liquid pick up 82 may be readily removed from the receptacle. Therefore the receptacle may be readily supplied with a suitable liquid, such as water, and subsequently the moistening member can be readily mounted in the receptacle, the latter being also removably mounted in the recess 85 which merges vertical grooves 88 for removably guiding the spaced ribs 87.

Various changes may be made in details of construction and arrangement of parts without departing from the spirit of the invention or sacrificing any of the advantages thereof inherent therein.

I claim:

1. In a scale, a hollow circular casing having an opening, a base for sustaining said casing, bearing means carried by said base, closure means secured to said casing, a support projecting into said casing and having spaced arms sustained by said closure means, a plunger closely but movably surrounding said support and having slotted means linearly guided by said arms, a loading platform carried by said plunger, a worm having alined shaft means journaled in said support and bearing means, spring means interposed between said support and platform for normally holding the latter elevated, means projecting from said plunger and cooperating with said worm for rotatably driving the latter upon linear displacement of said plunger, and an indica carrying drum fastened to said worm and bodily rotatable therewith.

2. In a scale, a hollow circular casing having an opening, a base for sustaining said casing, bearing means carried by said base, closure means secured to said casing, a support projecting into said casing and having spaced arms sustained by said closure means, a plunger closely but movably surrounding said support and having slotted means linearly guided by said arms, a loading platform carried by said plunger, a worm having alined shaft means journaled in said bearing means and support, spring means interposed between said support and platform for normally holding the latter elevated, means projecting from said plunger and cooperating with said worm for rotatably driving the latter upon linear displacement of said plunger, an indicia carrying drum concentrically disposed within said casing and fastened to said worm and bodily rotatable therewith, indicator means for determining the extent of rotational displacement of said drum before said opening, and means on said plunger to limit linear displacement thereof.

3. In a scale, a hollow circular casing having an opening, a base fixedly sustaining said casing, bearing means carried by said base, annular closure means secured to said casing, a cup projecting into said casing and having spaced and radially disposed arms sustained by said closure means, a plunger guided by said closure means and closely but movably surrounding said cup and having slotted means linearly guided by said arms, a loading platform carried by said plunger, a worm having alined shaft means journaled in said bearing means and said cup, spring means interposed between said cup and platform for normally holding the latter elevated, means extending from said plunger and cooperating with said worm for rotatably driving the latter upon linear displacement of said plunger, an indicia carrying circular drum fastened to said worm and bodily rotatable therewith, and indicator means for determining the extent of rotational displacement of said drum before said opening.

4. In a scale, a hollow circular casing having an opening, a base for fixedly sustaining said casing, bearing means carried by said base, annular closure means secured to said casing, a cup projecting into said casing and having spaced arms sustained by said closure means, a plunger surrounded by said closure means and closely but movably surrounding said cup and having slotted means linearly guided by said arms, a loading platform carried by said plunger, a worm having alined and vertically arranged shaft means journaled in said bearing means and said cup, spring means interposed between said cup and platform for normally holding the latter elevated, means extending from said plunger and cooperating with said worm for rotatably driving the latter upon linear displacement of said plunger, an indicia carrying drum revolvable about its vertical axis and fastened to said worm and bodily rotatable therewith, and indicator means for determining the extent of rotational displacement of said drum before said opening.

5. In a scale, a circular cylindrical casing having an opening, a base for sustaining said casing, adjustable bearing means carried by said base, closure means secured to said casing, a cup projecting into said casing and having spaced arms sustained by said closure means, a plunger closely but movably surrounding said cup and having slotted means linearly and slidably guided by said arms, a loading platform carried by said plunger, a worm having vertically alined shaft means journaled in said cup and bearing means, helicoidal spring means interposed between said cup and platform for normally holding the latter elevated, means carried by said plunger and cooperating with said worm for rotatably driving the latter upon linear displacement of said plunger, a hollow circular indicia carrying drum revoluble about its vertical axis and removably fastened to said worm and bodily rotatable therewith, and indicator means for determining the extent of rotational displacement of said drum before said opening.

6. In a scale, a base, bearing means carried by said base, a hollow casing secured to said base and having an opening, closure means secured to said casing, a circular indicia carrying drum concentrically disposed within said casing, a cage within said casing, means securing said cage to said closure means, bearing means carried by said cage, a member having helicoidal grooved means and including alined shaft means journaled in both of said bearing means, means for bodily securing said drum to said member, a platform carrying plunger having means slidably guided by said closure means and including means for interlocking with said grooved means for rotating said member upon linear displacement of said plunger to revolve said drum across said opening, and spring means secured to said plunger and to said closure means for resisting the rotation of said member and for normally holding said platform elevated.

7. In a scale, a base, bearing means carried by said base, a hollow casing secured to said base and having an opening, closure means secured to said casing, and circular indicia carrying drum concentrically disposed within said casing, a cage within said casing, means securing said cage to said closure means, bearing means carried by said cage, a member having helicoidal grooved means and including alined shaft means journaled in both of said bearing means, means for bodily securing said drum to said member, a platform carrying plunger having means slidably guided by said closure means and including means for interlocking with said grooved means for rotating said member upon linear displacement of said plunger to revolve said drum across said opening, spring means secured to said plunger and to said closure means for resisting the rotation of said member and for normally holding said platform elevated, and means to limit rectilinear displacement of said plunger relative to said casing.

8. In a scale, a base, bearing means carried by said base, a hollow casing secured to said base and having an opening, closure means secured to said casing, a circular indicia carrying drum concentrically disposed within said casing, a cage within said casing, means adjustable securing said cage to said closure means, bearing means carried by said cage, a member having helicoidal grooved means and including alined shaft means journaled in both of said bearing means, means for bodily securing said drum to said member, a platform carrying plunger having means slidably guided by said closure means and including means for interlocking with said grooved means for rotating said member upon linear displacement of said plunger to revolve said drum across said opening, and a normally compressed helicoidal spring means interposed between said plunger and closure means for resisting the rotation of said member and for normally holding said platform elevated, and means clamping a portion of said spring to said closure means and plunger.

9. In a scale, a base, bearing means carried by said base, a hollow casing secured to said base and having an opening, closure means secured to said casing, a circular indicia carrying drum concentrically disposed within said casing, a cage within said casing, means securing said cage to said closure means, stop means fixedly carried by said cage, a member having helicoidal grooved means and including alined shaft means journaled in said bearing means and stop means, means for bodily securing said drum to said member, a platform carrying plunger having means slidably guided by said closure means and including means for interlocking with said grooved means for rotating said member upon linear displacement of said plunger to revolve said drum across said opening, and helicoidal spring means in part surrounding said cage and secured to said plunger and to said closure means for resisting the rotation of said member and for normally holding said platform elevated.

10. In a scale, a base, bearing means carried by said base, a hollow casing secured to said base and having an opening, closure means secured to said casing, a circular indicia carrying drum concentrically disposed within said casing, a cage within said casing, means securing said cage to said closure means, fixed bearing means carried by said cage, a member having helicoidal grooved means and including alined shaft means journaled in both of said bearing means, detachable clamping means for bodily securing said drum to said member, a platform carrying plunger slidably guided by said closure means and including means for interlocking with said grooved means for rotating said member upon linear displacement of said plunger to revolve said drum across said opening, and spring means secured to said plunger and to said closure means for counterbalancing the load applied to said platform member and for normally holding said platform elevated.

LOUIS von CSEH.

REFERENCES CITED

The following references are of record in the file of this patent:

UNITED STATES PATENTS

| Number | Name | Date |
|---|---|---|
| Re. 16,323 | Weber | Apr. 13, 1926 |
| 809,826 | Lorentzen | Jan. 9, 1906 |
| 978,204 | Prouty | Dec. 13, 1910 |
| 1,127,165 | Berger | Feb. 2, 1915 |
| 1,210,382 | Weber | Dec. 26, 1916 |
| 1,295,258 | Becker | Feb. 25, 1919 |
| 1,412,350 | Jones | Apr. 11, 1922 |
| 1,772,277 | Carlson | Aug. 5, 1930 |
| 1,895,863 | Pollak | Jan. 31, 1933 |

FOREIGN PATENTS

| Number | Country | Date |
|---|---|---|
| 30,352 | Norway | Jan. 8, 1919 |
| 86,750 | Switzerland | Oct. 1, 1920 |
| 182,111 | Switzerland | Apr. 1, 1936 |
| 251,621 | Germany | Oct. 4, 1912 |
| 329,915 | Germany | Dec. 1, 1920 |